Patented Aug. 24, 1926.

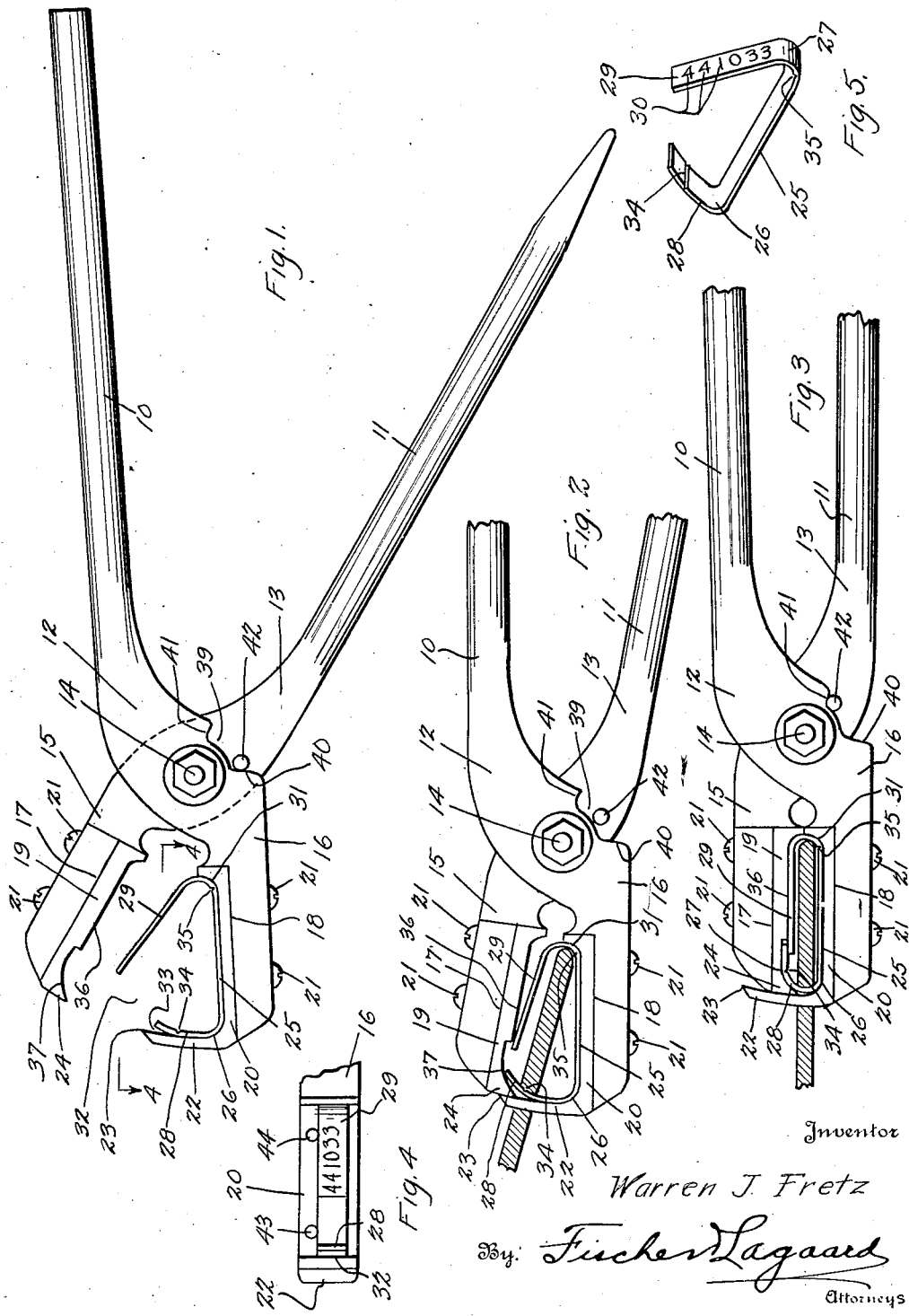

1,596,872

UNITED STATES PATENT OFFICE.

WARREN J. FRETZ, OF ST. PAUL, MINNESOTA, ASSIGNOR TO WILLIAM COOPER & NEPHEWS, INC., OF CHICAGO, ILLINOIS, A CORPORATION OF ILLINOIS.

EAR-TAG-APPLYING DEVICE.

Application filed June 29, 1923. Serial No. 648,492.

My invention relates to ear tag applying devices has for its object to provide a device by means of which tags used for marking cattle may be readily inserted in an animal's ear and clinched about the same to hold the tag in place.

Another object is to provide a device adapted to pierce the ear and to simultaneously force an ordinary ear tag through the opening made in the ear and to clinch said tag in place.

A still further object of the invention resides in providing a device whereby an ordinary straight edged ear tag may be used.

A still further feature of the invention resides in providing an ear tag having a sloping curved end adapted to engage the cut portion of the ear to cause the tag to remain taut in place so that the swelling of the ear will not stop the circulation of the blood through the same and cause the ear to slough away.

In carrying out my object, I provide a device in the shape of a pair of tongs, having a pair of cutting edges at the extreme end of the same. Within one of the tongs is placed an ear tag which is formed with a portion extending along one of the said cutting edges, so that when the device is closed, the said portion of the ear tag passes, together with the cutting member of the tong, through the ear. In addition, the device is further provided with clinching means, whereby the tag is clinched in place to securely hold same attached to the animal's ear.

The full object and advantages of my invention will be found in the detailed discussion thereof, and are particularly pointed out in the claims.

Figure 1 is a side elevational view of my invention, showing one of the ear tags positioned within the same prior to the application of the device in an animal's ear.

Figure 2 is a view of a portion of my invention, similar to Figure 1, illustrating the position of the various parts of the invention after the cutting member thereof has penetrated through the ear.

Figure 3 is similar to Figure 2, showing the position of the parts after the ear tag has been properly applied.

Figure 4 is a sectional view taken on line 4—4 of Figure 1.

Figure 5 is a perspective view of one of the blanks used in forming my improved ear tag prior to the application of the same to the ear.

In the applying of ear tags to the ears of cattle, great difficulty has been found in the use of the plain standard tag, in that several operations are necessary before the tag can be completely attached to the animal's ear. A hole is first usually punched through the ear, the tag inserted through the hole and the same then clinched in place. With my invention all of these operations are performed at one time, so that the tag may be quickly and effectively applied to the animal's ear. Self punching ear tags have been used but these tags have been found to be too expensive and many of them have been found to mutilate the animal's ear, in being applied to the same to such an extent as to cause the tag and a portion of the ear to slough off. My invention permits using the simple standard tag without the necessity of applying the self-piercing feature occurring with these more expensive tags.

The device for applying my tag can best be seen in Figure 1, and comprises primarily two handles, 10 and 11, which are bent, shown at 12 and 13, and hingedly connected together by a bolt, 14, to simulate the shape of a pair of tongs. At the extreme end of the handles 10 and 11 are formed jaws 15 and 16, which are adapted to come together as shown in Figure 3 when the device is closed; both of the jaws 15 and 16 are formed with recesses 17 and 18, in which are positioned die members 19 and 20; these die members are held in place by screws 21, which are directly screwed into said die members securely holding them in place upon the jaws 15 and 16. The die member 20 is provided at its extreme end with a piercing cutter 22, which extends outwardly therefrom and which is of an arcuate formation, being substantially concentrically situated relative to the axis of the bolt 14. This cutter 22 is of a width slightly greater than the tag and is rather thin throughout its length, being bevelled at its extreme points to form a sharp cutting edge 23 at the extremity thereof. The die member 19 is similarly formed with a complemental cutter 24, which is considerably shorter than the cutter 22 and which is adapted to follow along within said cutter 22 when the device is closed, said cutter 24 acting in conjunction with the piercing cutter 22 in a manner similar to a pair of shears.

The tag which is shown in Figure 5 and which is most easily adapted to be used in conjunction with my invention is formed of a single piece of ribbon material 25, which is bent at 26 and 27 to provide two outwardly extending ends 28 and 29, these ends are angularly disposed relative to the tag, the end 29 being considerably longer than the end 28 and forming a portion of the tag on which suitable reference characters as are indicated at 30 may be applied.

In positioning the tag within the applying device, the tag is placed upon the die member 20 which is curved at 31 to fit about the bent portion 27 of the tag. It will be noted that the end 28 of the tag is bent substantially in a curve of the same radius as the piercing cutter 22 so that the tag when positioned upon the die member 20 fits along the same as clearly shown in Figure 1. This die member is made of such a size that the tag fits snugly within the same and is held in place by means thereof.

In Figure 4, I have shown two pegs, 43 and 44, which are attached to the die member 20 and which serve to hold the tag blank in place when the same is positioned upon the said die member.

When the tag is to be applied to the ear, the device is positioned about the ear of the animal, the same passing through the space 32 between the extreme ends 28 and 29 of the tag 25 and between the two cutting members 22 and 24 of the device. In applying the device, handles 10 and 11 are brought together which causes the piercing cutter 22 to co-operate with the cutter 24 and to pierce the ear of the animal, the cutter 22 passing through the same together with the end 28 of the tag. It will be noted in Figure 1 that the protruding end 28 of the tag 25 is constructed to fall away from the piercing cutter 22, to provide the slight crevice 33 between the same. This is for the purpose of permitting the extreme point of the cutter 24 to pass behind the said portion 28 of tag 25 so that same may be bent over and clinched as will now be described. In clinching the tag in place, the tag is formed with two score marks 34 and 35 extending across the same, which serve to aid in bending the portions 28 and 29 of the tag together to properly apply the tag to the ear. When the tag has been properly clinched, the same occupies the position about the ear as shown in Figure 3, the portion 29 lying parallel with the body of the tag while the portion 28 extends through the pierced portion of the ear and overlaps the extreme end of portion 29. Within the die member 19, beginning at the extreme point of the cutter 24, is provided a curved surface 37, which extends rearward for a portion of the length of the die member 19. This portion of the die serves to force the ends 28 of tag 25 inwardly and to bring the same in the shape shown in Figure 3. The said die is further formed with a flattened surface 36 which extends rearwardly from the end of the surface 37 which is offset therefrom. This surface engages the top of the portion 29 to tag 25 and causes the same to be bent downwardly as brought out in Figure 2. The device is so constructed that the portion 29 is bent down faster than the portion 28 so that the said latter portion overlaps portion 29 when the tag finally is clinched together, thereby attaching the tag to the ear of the animal as shown in Figure 3.

Score marks 34 and 35 previously referred to cause the tag to assume the desired shape, the score mark 35 causes the portion 29 to bend along the said point thereby removing the bending strain from the said portion 29 of the tag so that the same lies perfectly flat and parallel to the body of the tag after same has been clinched. Score mark 34 in a similar manner causes the portion 28 to bend along the same so that extreme portion of the tag overlaps the member 29, at the same time tag is given an inclined surface indicated at 28, which engages the slit portion of the ear and causes the tag to remain taut in place. With this construction the tag hangs always taut upon the ear so that the same cannot move relative thereto, again suitable space is left between the parallel members of the tag permitting the ear to swell without stopping the circulation of blood and causing the ear to slough away and the tag to drop out.

For terminating the movement of the handle members 10 and 11 of the invention, I have arranged a recess 39 in the handle member 10 which is formed with two shoulders 40 and 41. These shoulders are adapted to engage a pin 42 which is secured to the other handle 11, so that the movement of the handles 10 and 11 is terminated when the device is fully opened or when the same has been closed to form a perfect tag.

The advantages of my invention are manifest. A device is provided in which the animal's ear may be pierced, the tag inserted through the opening thus formed and the same clinched in place upon the ear in a single operation. which may be done so quickly and effectively that the animal is not given an opportunity to hinder or prevent the application of the tag to the ear. At the same time a device is provided in which the less expensive plain tags may be used, thereby greatly economizing in the cost of the tags.

In accordance with the patent statutes, I have described the principles of operation of my invention, together with the apparatus which I now consider to represent the best embodiment thereof, but I desire to have it understood that the construction shown is only illustrative and that the invention can be carried out by other means and applied to uses other than those set forth within the scope of the following claims.

I claim:

1. A tag applying device comprising a pair of handles, a pivot therefor, a pair of jaws formed at the ends of said handles, a cutting member upon one of said jaws concentric to said pivot, a complemental cutter upon said other jaw also concentric to said pivot, said complemental cutter being of a length so that it can fit within said first cutting member after the cutting.

2. A tag applying device comprising a pair of pivoted handles, a pair of jaws formed at the ends of said handles, a cutting member projecting from one of said jaws, a complemental cutter upon the other jaw, means adjacent said complemental cutter upon said jaw for clinching a tag, said complemental cutter being spaced from said pivot so that it can fit within said cutting member and said clinching means being adapted to operate upon a tag upon completion of the cut and when the complemental cutter is sliding into the first mentioned cutting member.

3. A tag applying device including a pair of pivoted handles, a pair of jaws formed at the ends of said handles, a die member secured to one of said jaws having a projecting cutting member and a spaced abutment defining with said cutting member a U-shaped recess wherein a tag may be supported and stop means upon said jaw between the cutting member and said abutment whereby the tag may be slid into the recess from the side.

4. A tag applying device comprising a pair of handles pivoted to one another, a pair of jaws attached to said handles, a piercing cutter formed on one of said jaws, a complemental cutter formed on the other of said jaws and means formed on said jaws for holding and clinching an ear tag about the object pierced by said piercing cutter.

5. In a device of the class described, two pivoted members, one of said members having a cutting member thereon extending toward the other member, the last named member being provided with a complemental cutter and a depressed clinching surface and said last named member being also provided with a raised surface constituting a bending surface for tags positioned upon said first mentioned member.

6. In a device of the class described, two cooperating members, one of said members having a cutting member thereon and means for supporting an open strip tag, the other of said members having means for bending one end of said tag and means for clinching the other end of said tag.

7. In a device of the class described, two pivoted members, one of said members having a cutting member thereon and means for supporting an open strip tag, a complemental cutter upon the other pivoted member, means upon said last named member for bending one end of said tag and means also upon said last named member for clinching the other end of said tag.

8. In a device of the class described, two pivoted members, one of said members having a cutting member thereon and means for supporting an open strip tag, a complemental cutter upon the other pivoted member, means upon said last named member for bending one end of said tag and means also upon said last named member for clinching the other end of tag, and means limiting the movement of said members toward one another so that the tag may be bent only for a predetermined distance.

9. An ear tag applying device comprising a pair of pivoted handles, a pair of jaws formed on said handles, an arcuate piercing cutter formed on one of said jaws adapted to have a portion of an ear tag blank positioned thereagainst, a complemental cutter formed on said other jaw adapted to cooperate with said piercing cutter and a curved surface formed on said second jaw adapted to engage against an arcuate portion of said tag blank to bend the same toward the pivot so as to clinch the same about the object pierced.

10. A tag applying device comprising a pair of pivoted handles, a pair of jaws formed on said handles having die receiving recesses, die members positioned in said recesses, one of said die members having a concentrical cutter on its extreme end, a complemental cutter on the other die member and being shorter than the first mentioned cutter, said complemental cutter being provided with a curved portion extending rearwardly and an offset portion on said die member carrying said complemental cutter forming a surface on said die member for bending one end of a tag positioned on the other die member.

WARREN J. FRETZ.